G. T. WARWICK.
MACHINE FOR MAKING BLANKS FOR SCREWS.
APPLICATION FILED APR. 21, 1910.
1,091,551.
Patented Mar. 31, 1914.
12 SHEETS—SHEET 2.
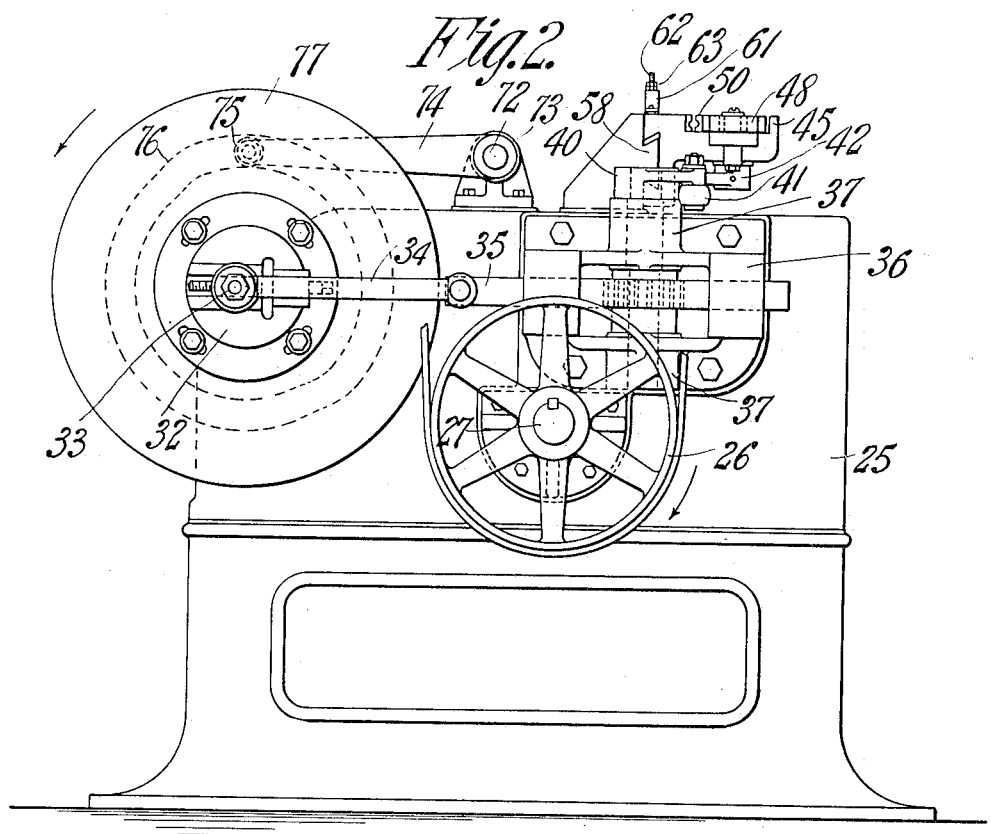
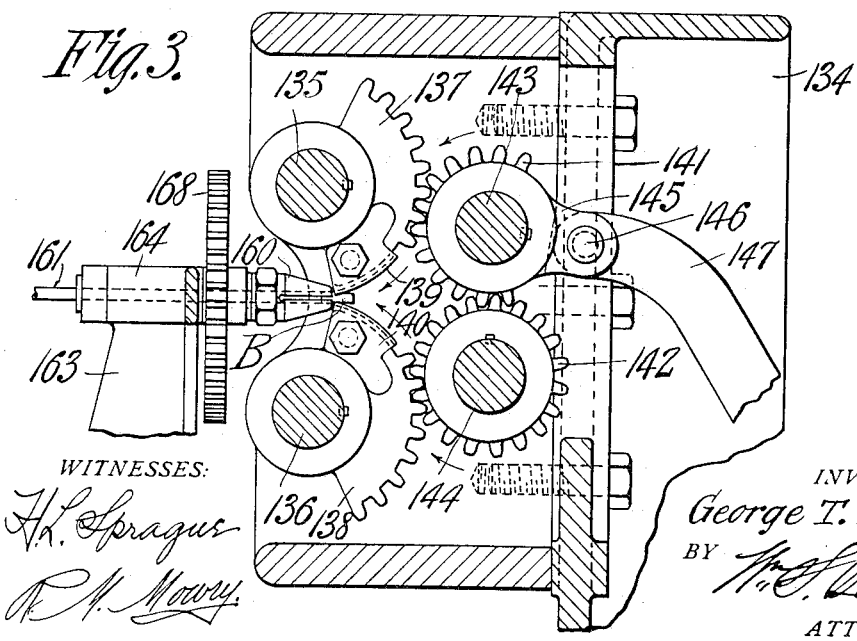
WITNESSES:
INVENTOR,
George T. Warwick,
BY
ATTORNEY.

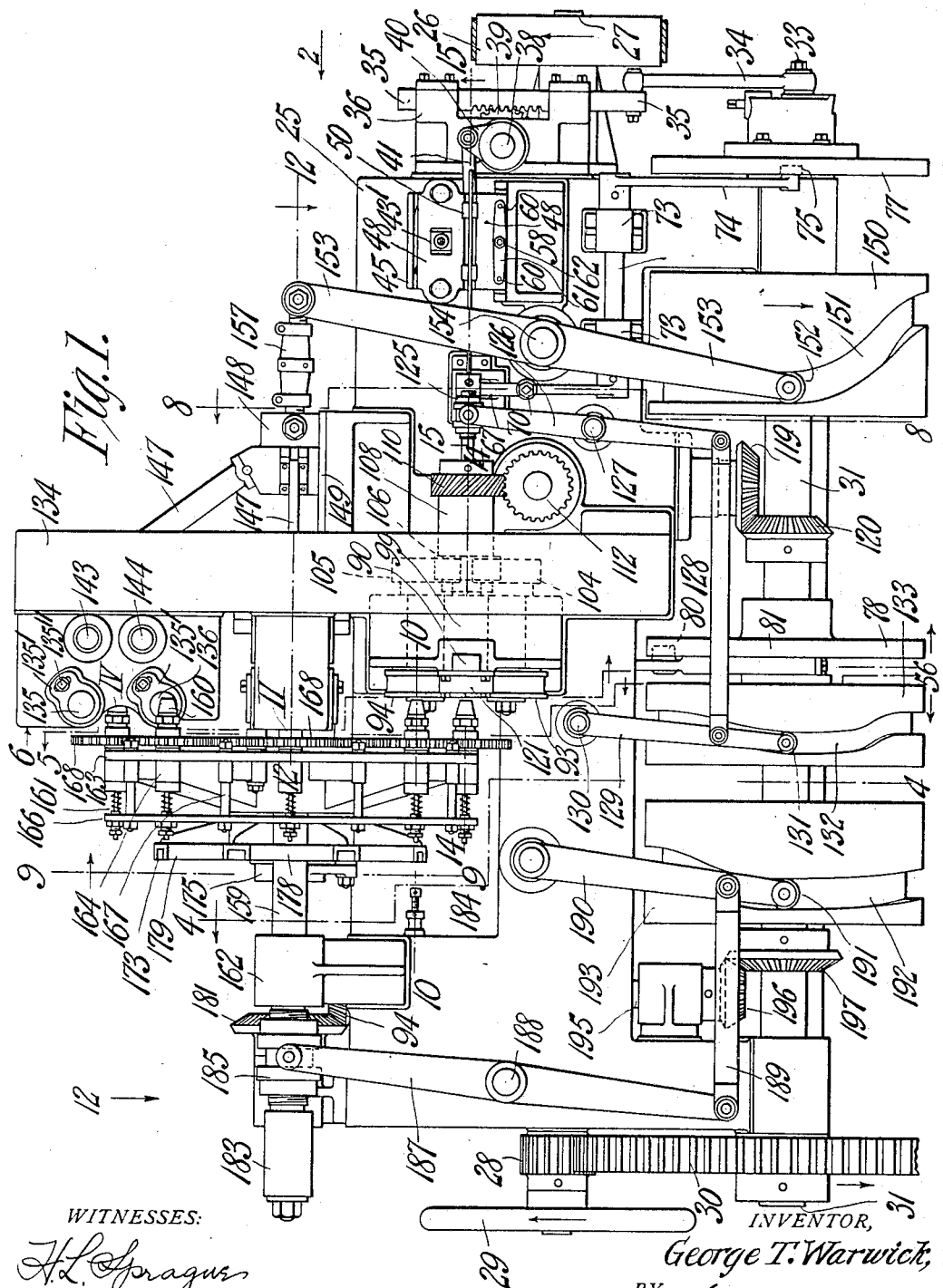

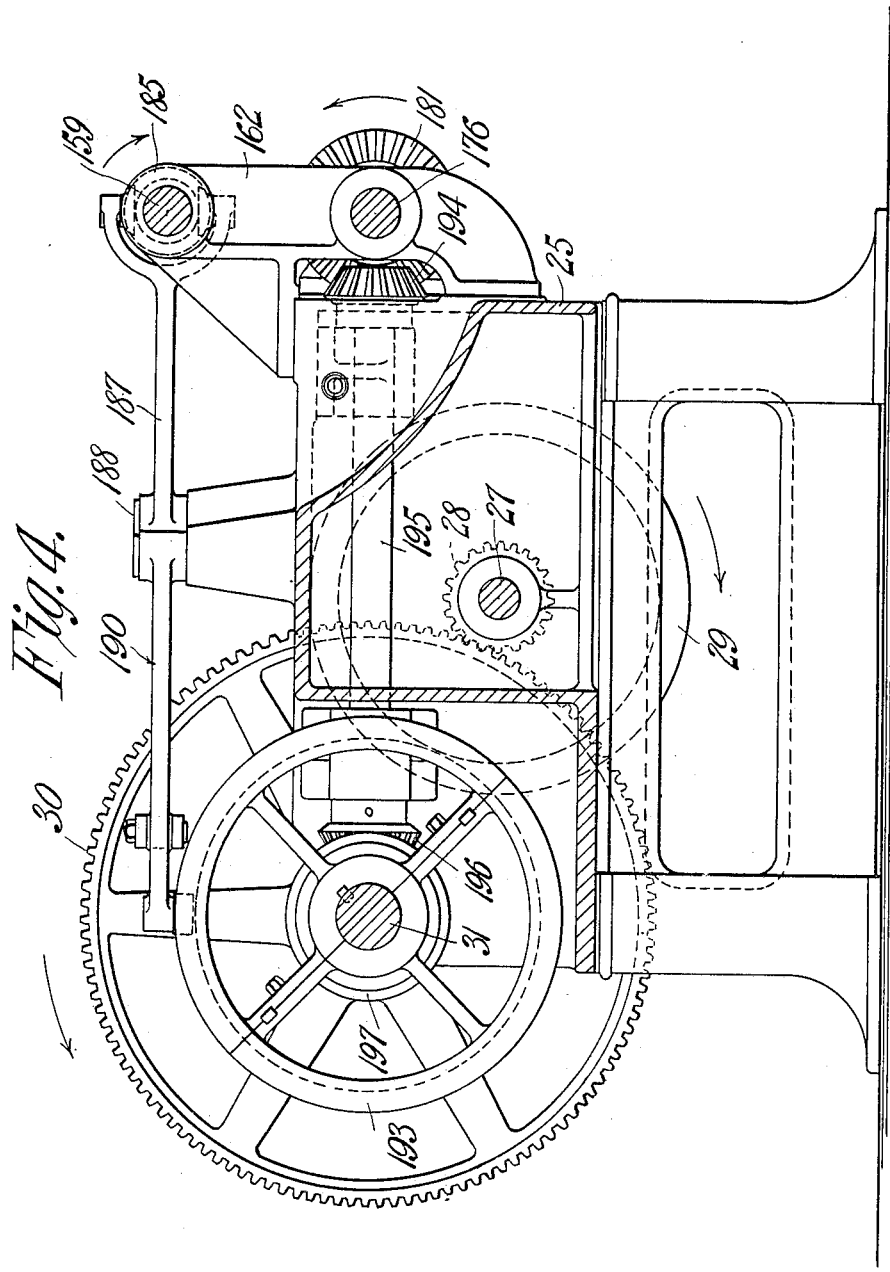

G. T. WARWICK.
MACHINE FOR MAKING BLANKS FOR SCREWS.
APPLICATION FILED APR. 21, 1910.
1,091,551.
Patented Mar. 31, 1914.
12 SHEETS—SHEET 4.
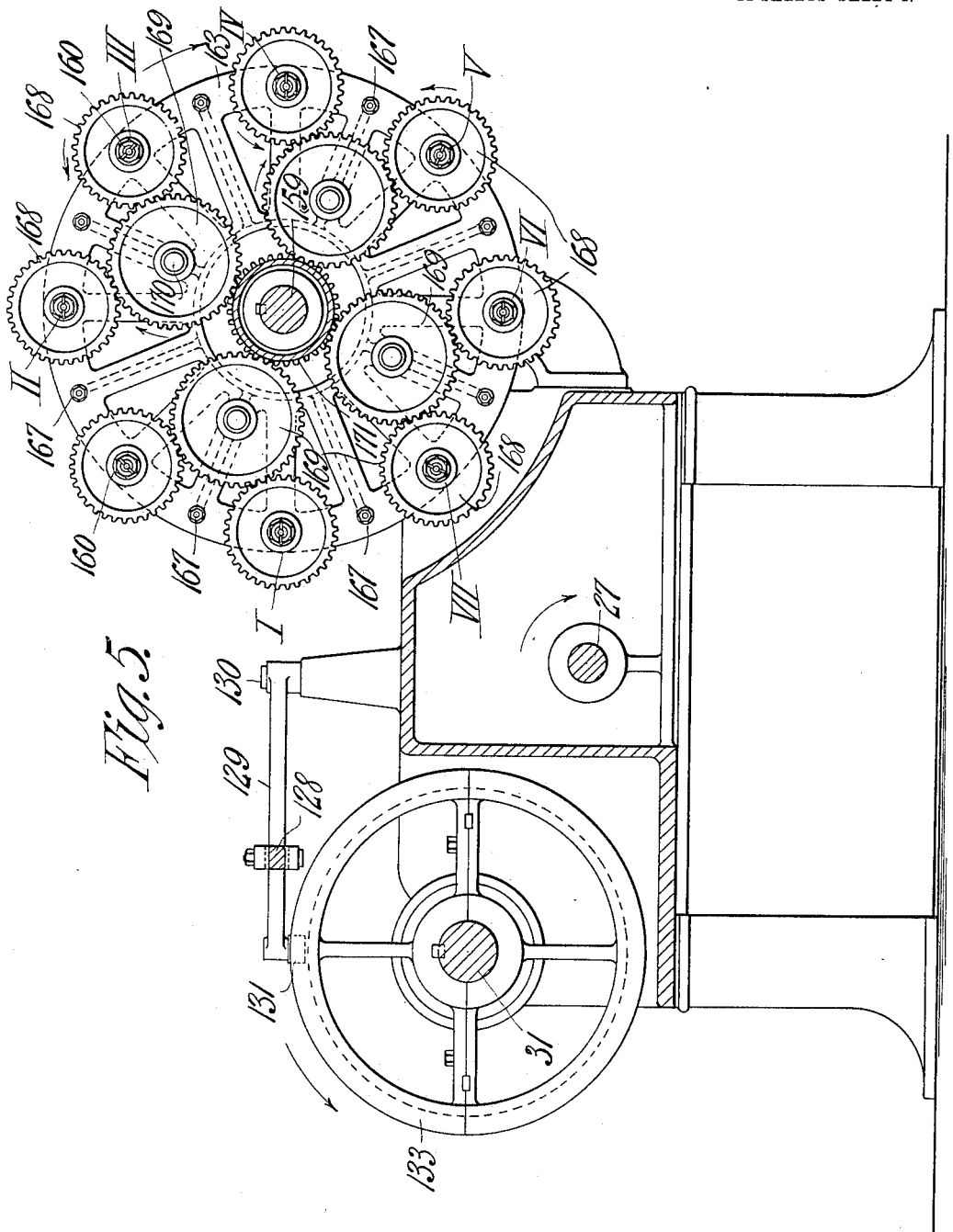
WITNESSES:
H. L. Sprague
R. M. Mowry
INVENTOR,
George T. Warwick,
BY
ATTORNEY.

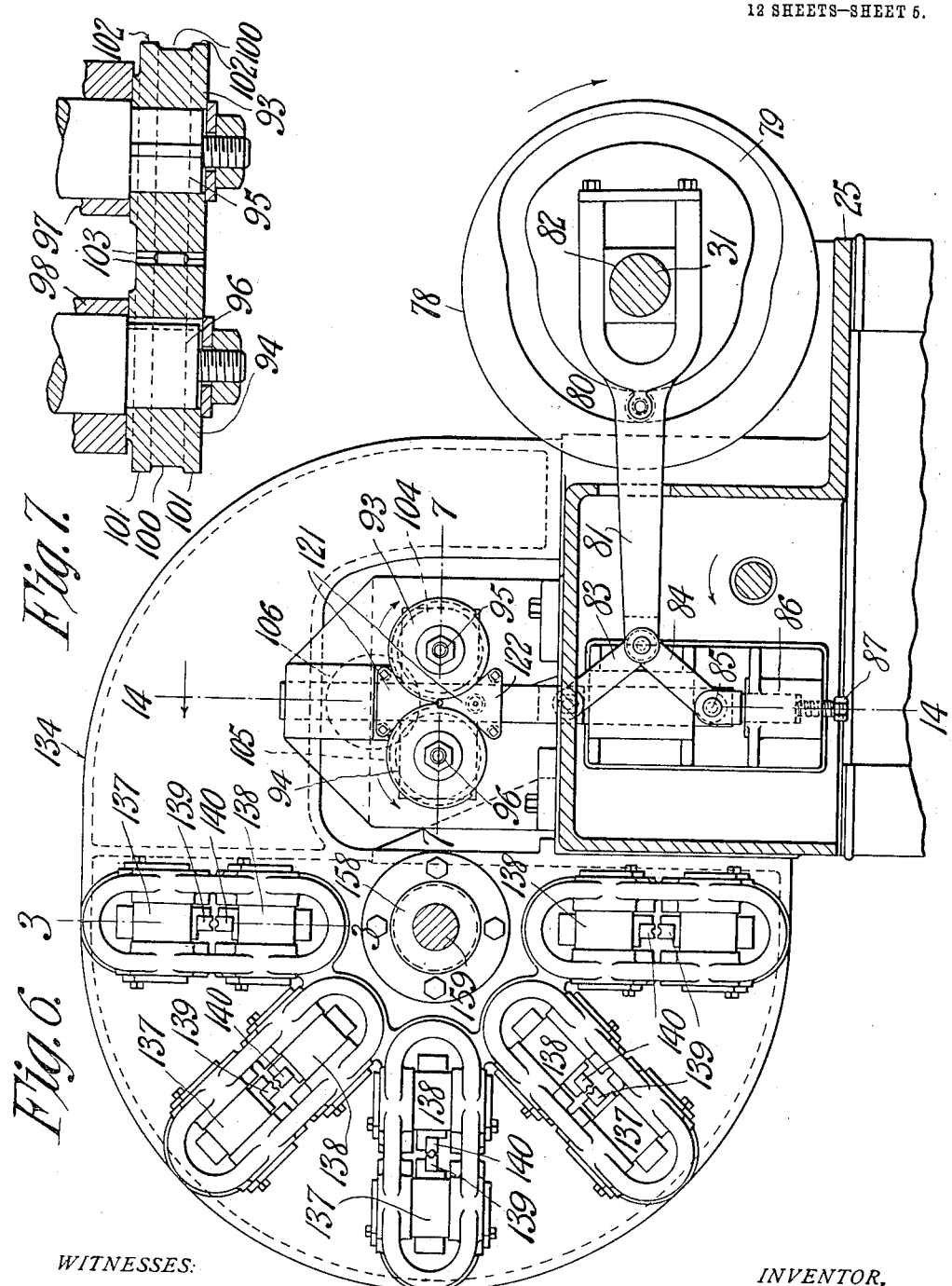

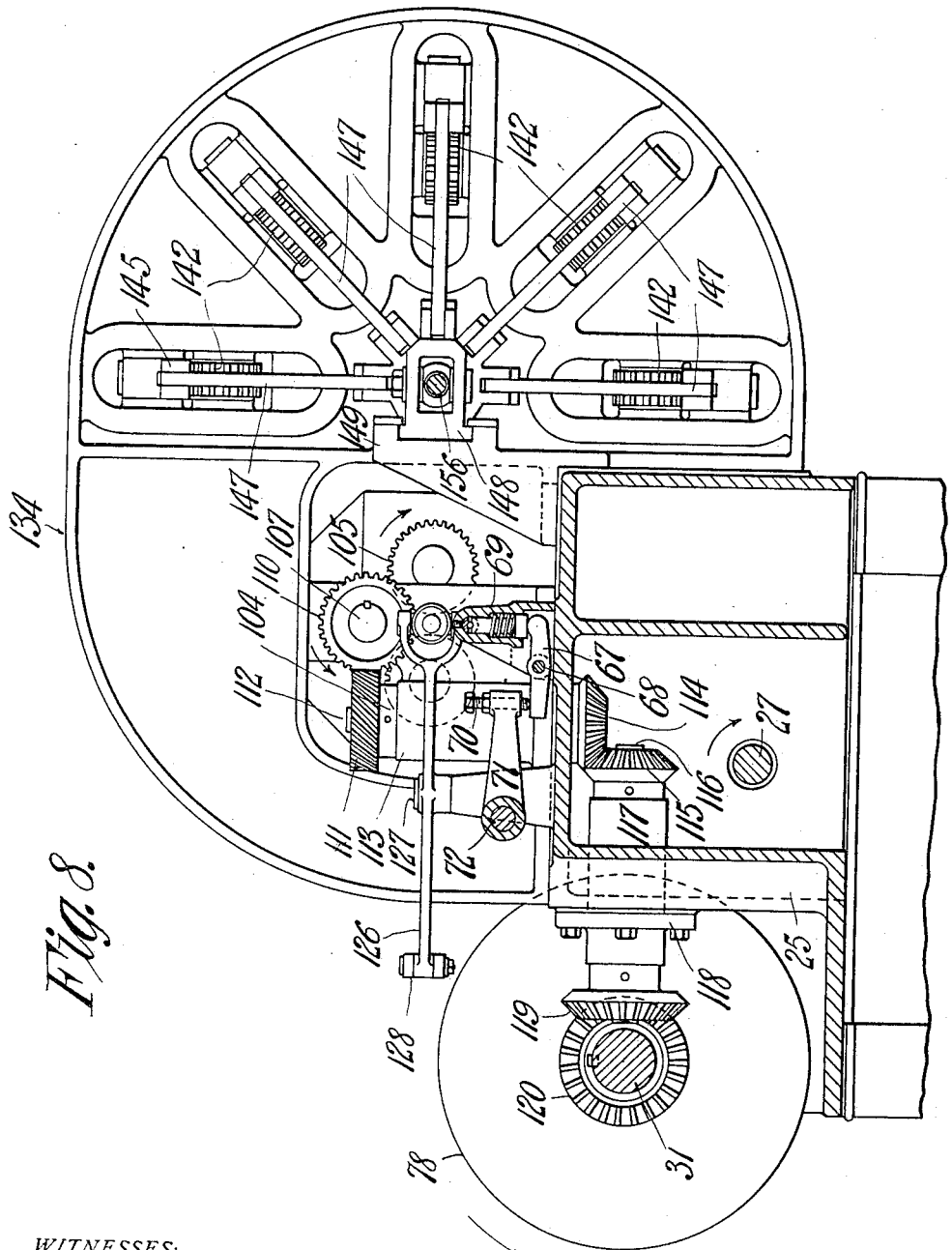

G. T. WARWICK.
MACHINE FOR MAKING BLANKS FOR SCREWS.
APPLICATION FILED APR. 21, 1910.

1,091,551.

Patented Mar. 31, 1914.
12 SHEETS—SHEET 7.

Fig. 9.

Fig. 10.

WITNESSES:
H. L. Sprague
R. M. Mowry

INVENTOR,
George T. Warwick,
BY
ATTORNEY.

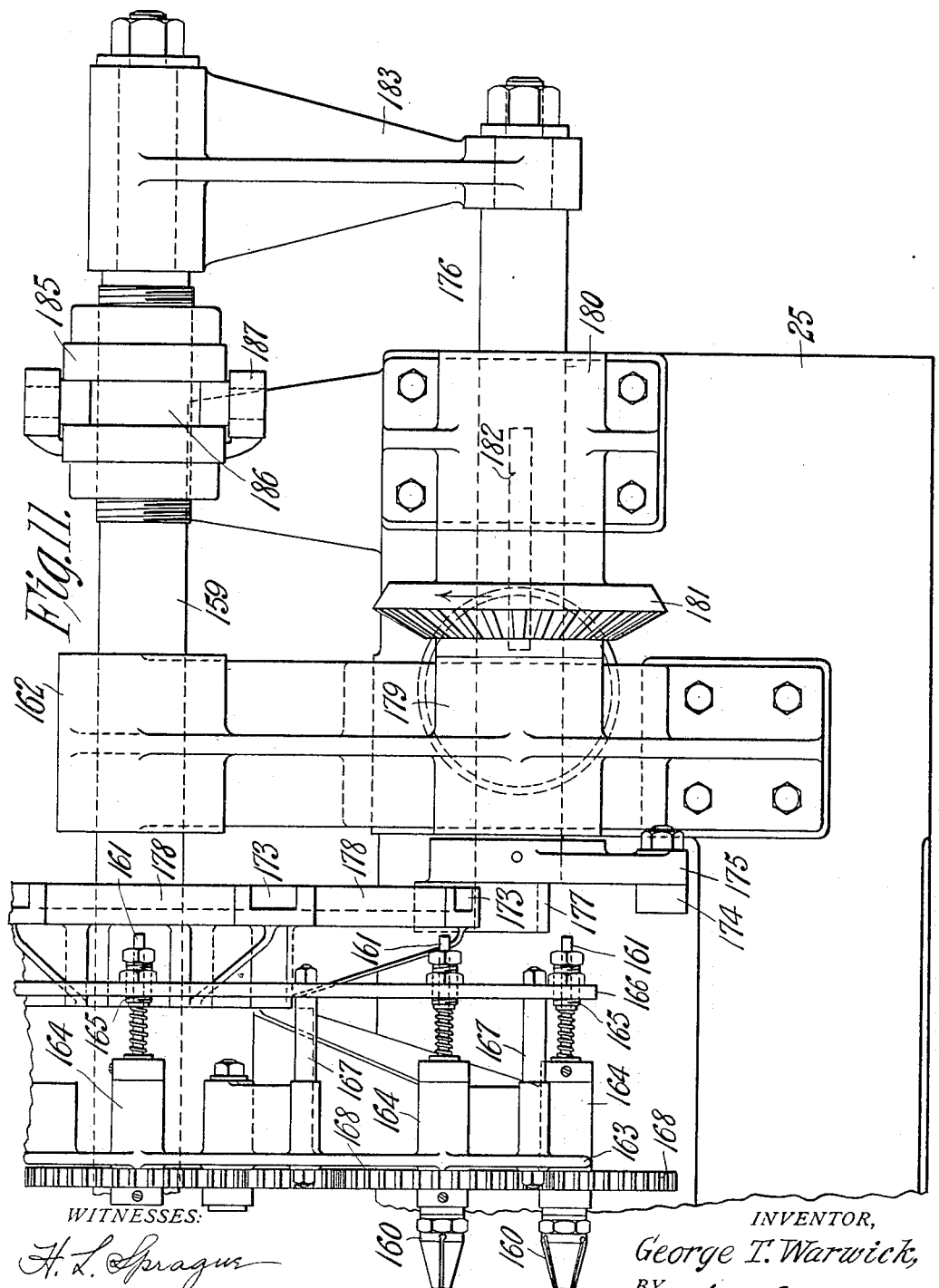

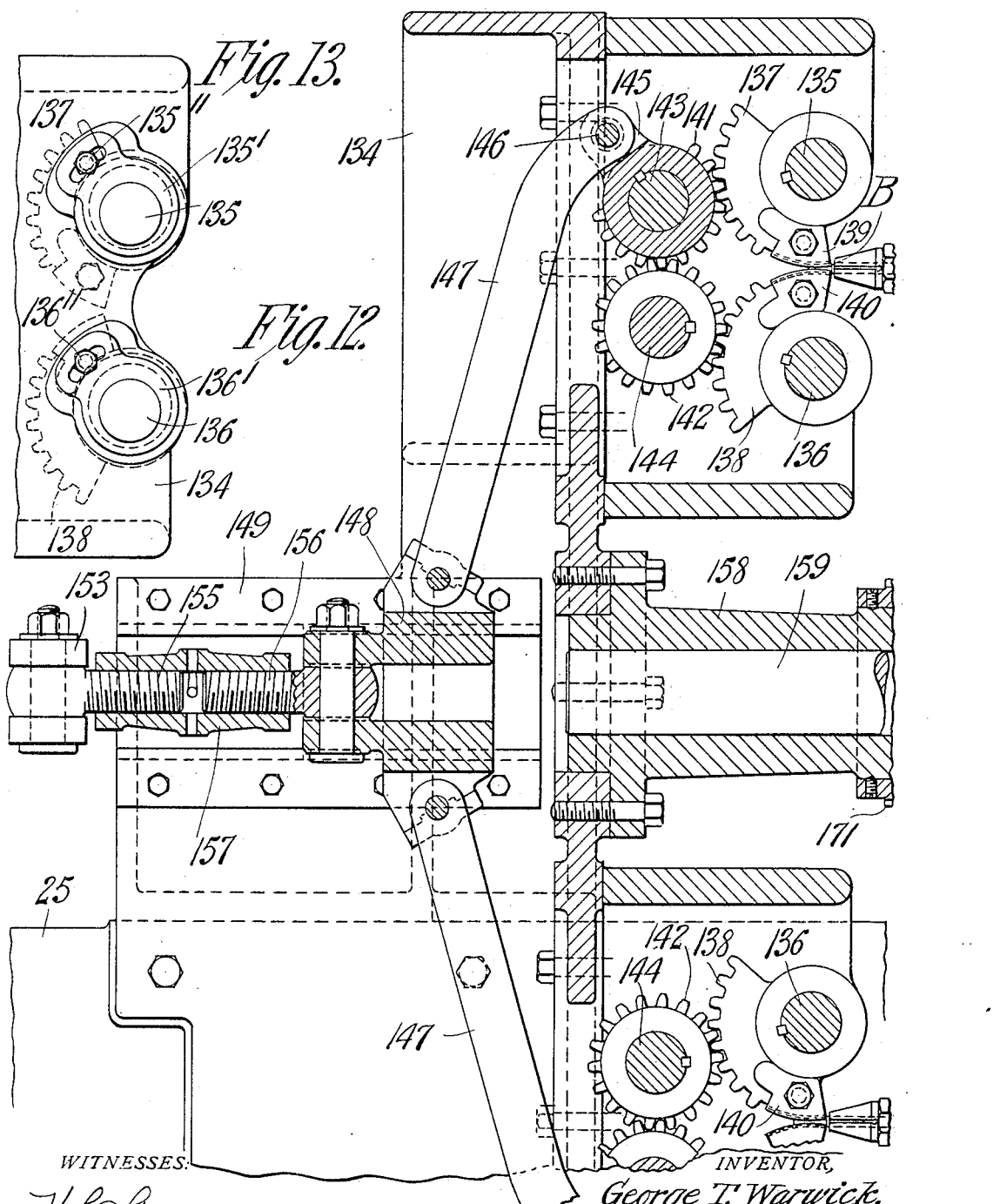

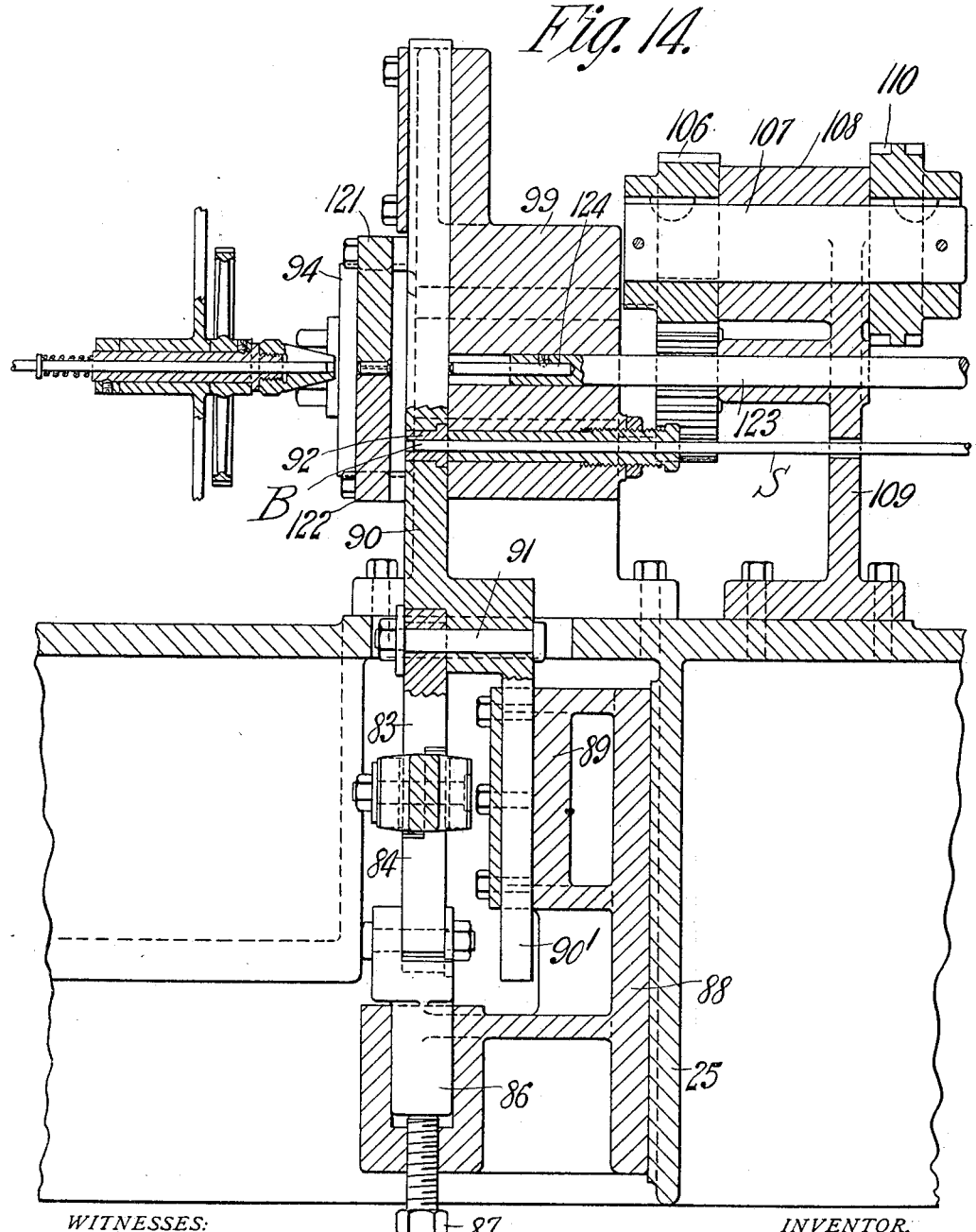

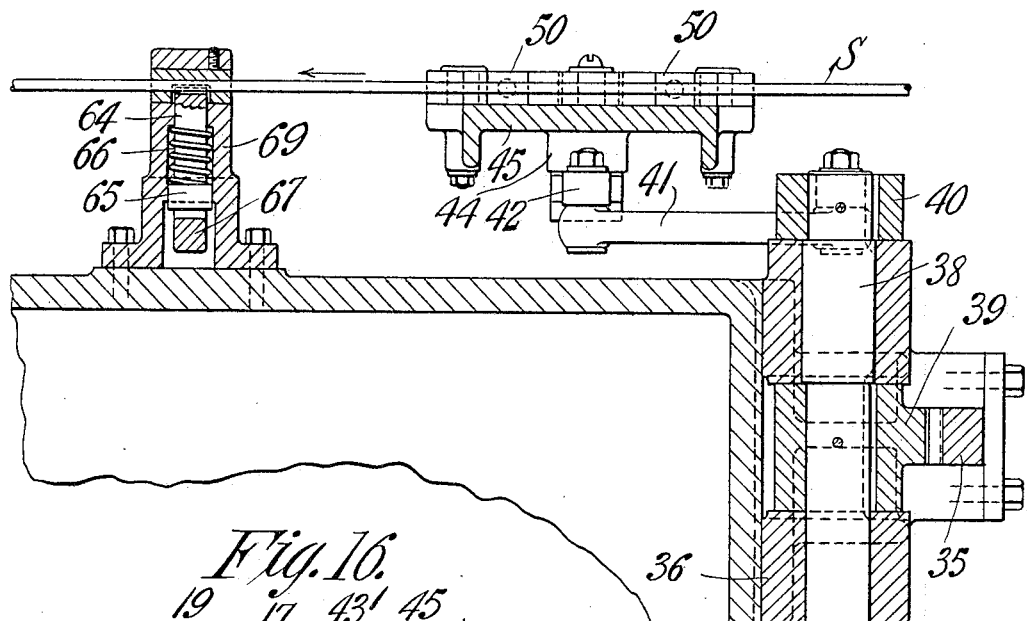
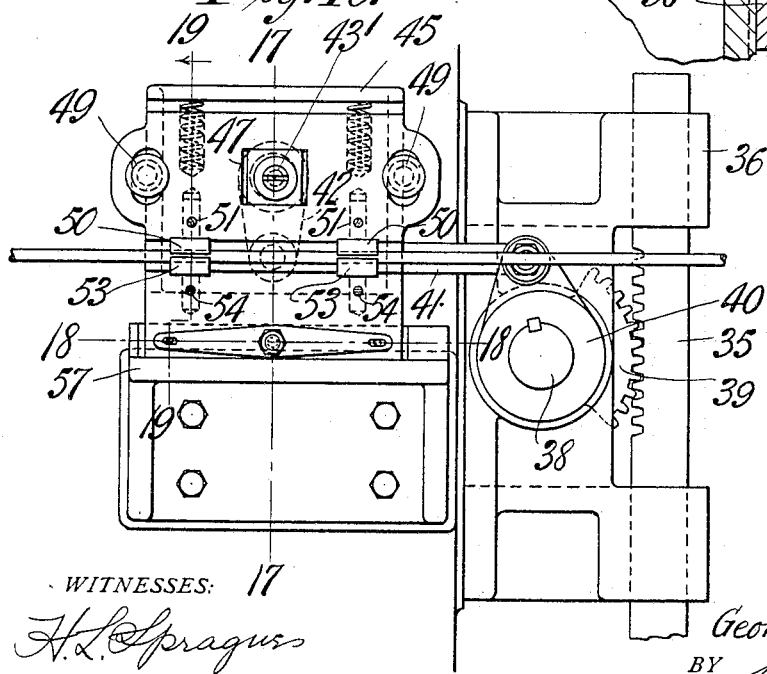

G. T. WARWICK.
MACHINE FOR MAKING BLANKS FOR SCREWS.
APPLICATION FILED APR. 21, 1910.
1,091,551.   Patented Mar. 31, 1914.
12 SHEETS—SHEET 12.
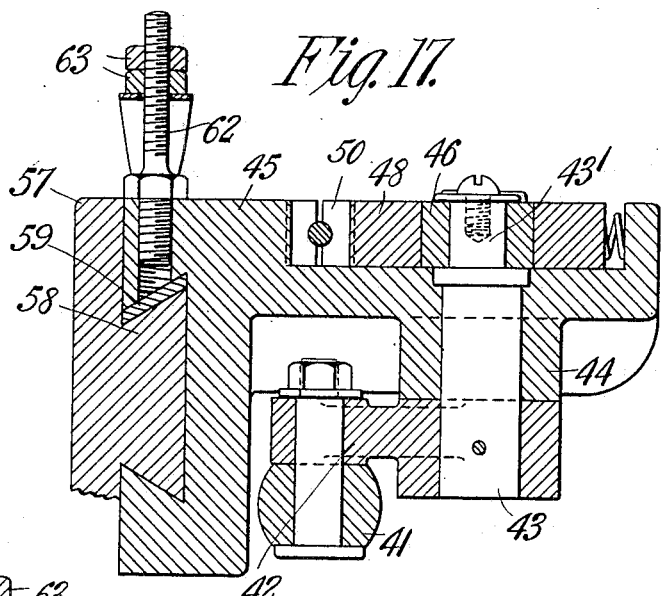
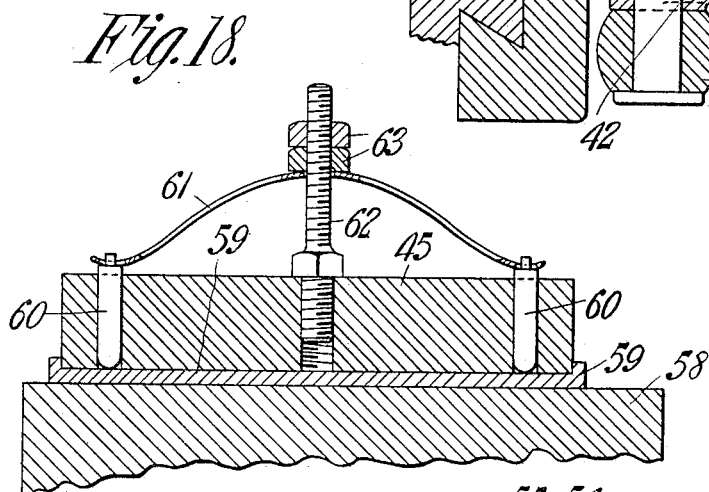
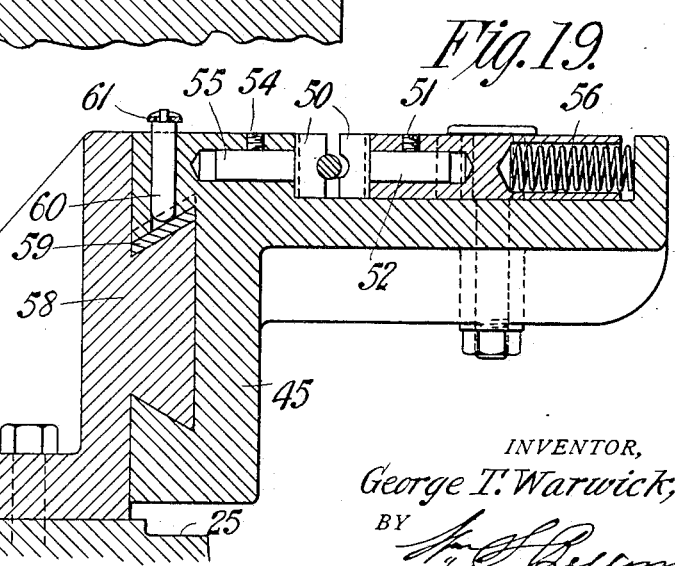
WITNESSES:
H. L. Sprague
P. M. Mowry
INVENTOR,
George T. Warwick,
BY
ATTORNEY.

UNITED STATES PATENT OFFICE.

GEORGE T. WARWICK, OF SPRINGFIELD, MASSACHUSETTS.

MACHINE FOR MAKING BLANKS FOR SCREWS.

1,091,551. Specification of Letters Patent. Patented Mar. 31, 1914.

Application filed April 21, 1910. Serial No. 556,842.

*To all whom it may concern:*

Be it known that I, GEORGE T. WARWICK, a citizen of the United States of America, and resident of Springfield, in the county of Hampden and State of Massachusetts, have invented certain new and useful Improvements in Machines for Making Blanks for Screws, of which the following is a full, clear, and exact description.

This invention relates to metal working machines, and more particularly to that class thereof which are employed for the purpose of forming blanks for screws, the blanks being cut from a roll of wire the diameter of which is substantially equal to the head of the screws or blanks, the shank portions of which are to be reduced by compression of the stock through a series of successive operations.

The invention has for one of its objects the provision of improved stock-feeding means, in combination with a cutting-off mechanism whereby the stock is cut into proper lengths which when swaged will constitute blanks of the required lengths and shank-diameters.

The invention has also for its object the provision of means whereby the blank lengths as originally cut from the stock or wire, will be what may be considered "rounded" at least at one of its ends (usually the shank end) and for whatever good effect such rounding may be, such for instance so that when the latter is reduced by the compressing or swaging mechanism, the end of the shank portion of the blank will be substantially flat and without leaving a hollow portion in its center. In connection with this statement it may be explained at this time that if the stock is cut off "square", and its diameter is thereafter gradually reduced by compression or swaging, the result will be that the outer circumferential portion of the blank will be slightly lengthened beyond the central portion thereof, so that in consequence the end of the blank would appear slightly hollowed, and therefore, it would become necessary to trim the end of the blank to a true surface. The mechanism above referred to is intended to overcome this objection.

The invention has, furthermore, for its object the provision in combination with the cutting off and end forming mechanism of means whereby the blank may be reduced at the shank portion thereof in a gradual manner so that little if any subsequent finishing or squaring off are necessitated.

Further objects of the invention will hereinafter appear and the means of their attainment be particularly pointed out in the claims.

The invention has been clearly illustrated in the accompanying drawings in which similar characters denote similar parts, and in which—

Figure 1 is a plan or top view of a machine embodying my invention. Fig. 2 is an end view thereof looking in the direction of arrow 2 of Fig. 1. Fig. 3 illustrates in detail one set of the coöperative dies whereby the shank portion of the blank is reduced. Fig. 4 is a vertical cross section on line 4, 4 indicated in Fig. 1 and looking toward the left end of said figure. Fig. 5 is a similar section on line 5, 5 of Fig. 1 looking in the same direction as Fig. 4. Fig. 6 is a similar section on line 6, 6 (substantially the same as 5, 5) but looking toward the pulley end of the machine or toward the right of Fig. 1. Fig. 7 is a horizontal section through the "burring" rolls whereby the ends of the cut-off blank are rounded, as above mentioned. Fig. 8 is a vertical section on line 8, 8 of Fig. 1 looking toward the left of said figure. Fig. 9 is a detail illustrating the manner of operating the chuck carrier which forms one element of the present machine. Fig. 10 is a longitudinal section through the blank-carrying chuck and the mechanism whereby the blank is ejected in substantially finished condition. Fig. 11 is a rear elevation or back view of the chuck-carrier and its operating mechanism. Fig. 12 is a central section of the device which carries the shank-reducing mechanism. Fig. 13 illustrates the means whereby the reducing rolls may be adjusted relatively to each other so as to produce shanks of different diameters. Fig. 14 is a vertical cross section of the cut-off mechanism on line 14, 14 indicated on Fig. 6 on an enlarged scale. Fig. 15 is a vertical section of the stock-feeding means and also the device whereby the stock is held against retrograde movement during the return stroke of the feeding-in means. Fig. 16 is a top view of the feeding-in mechanism corresponding to Fig. 15. Fig. 17 is a vertical cross section of the feeding-in device on line 17, 17 of Fig. 16. Fig. 18 illustrates in longitudinal section the means whereby the feed-slide is frictioned at both ends of its stroke to permit proper operation of the stock-clamping means, and Fig. 19 is a vertical section of the feeding-in device on line 19, 19 indicated on Fig. 16.

Referring at first to the general construction or assemblage of the machine as a whole (see Fig. 1), the numeral 25 denotes a bed-plate on which the several elements are mounted. The driving-pulley is disposed on the right hand end of the machine and is herein indicated by 26, and power may be imparted thereto from any convenient source. The pulley 26 is mounted on and rotates the shaft 27 which extends from end to end of the bed 25, and carries at its other end a pinion 28 and also a hand-wheel 29 whereby the shaft 27 may be manually rotated when required. The pinion 28 is in engagement with a gear 30 secured upon the main cam-shaft 31 which really constitutes the controlling and timing element for operating the several mechanism and devices of which the machine is composed.

At the right hand end of the bed 25 is disposed the feeding-in mechanism for the stock and which is driven from the cam-shaft 31 by means of a crank disk 32 adjustably carrying a crank-pin 33 so as to impart more or less throw to the feeding-in mechanism to correspond to the required length of the blank. The crank-pin 33 (see also Fig. 2) is connected by a pitman-rod 34 with a rack-bar 35 guided for reciprocatory movement in a bracket 36 secured to the end of the bed-plate 25, and which is also provided with bearings 37 in which a shaft 38 is rotatably mounted. Secured to this shaft and intermediate the bearings 37 is a gear 39 which is in constant engagement with the teeth of the rack-bar 35 so that when a reciprocatory movement is imparted to said rack-bar, an oscillatory movement will be imparted to the gear 39 and consequently to the shaft 38.

Secured to the upper end of the shaft 38 is a crank 40 connected by a pitman-rod 41 with the slide on which the stock-grippers or feeders are mounted, this connection, however, being indirectly, and in such a manner that the reversal movement of the pitman-rod at either end of its stroke will first actuate the stock-gripping jaws and then move the slide bodily either in its active or in its return stroke. This mechanism is clearly shown in Figs. 15 to 17 inclusive, in which the pitman-rod 41 is shown connected to a crank-arm 42 mounted on a vertical spindle 43 which is journaled in a bearing 44 constituting a part of the feed-slide 45. The oscillatory movement of the vertical spindle 43 is utilized for the purpose of actuating the stock-gripping jaws either to engage or to release the stock as the case may be. This result is accomplished by forming the upper end of the spindle 43' eccentric, and mounted on this eccentric end 43' is a block fitted laterally in a recess provided therefor in the movable jaw of the feeding-in mechanism, sufficient room being left in said recess longitudinally thereof to permit the operation of the spindle 43, while any longitudinal movement of the jaw 48 is prevented on the feed-slide 45, as for instance by bolts 49 disposed at opposite sides of said jaw (see Fig. 16).

The feed-jaw is comparatively long and includes a pair of grippers 50 which are firmly held in the jaw 48, as for instance by set-screws 51 engaging the shanks 52 of said grippers (see Fig. 19). Coöperative with the grippers 50 are a pair of stationary grippers 53, the construction of which is similar to that of the grippers 50 and which are held in the main body of the slide 45, as for instance by set-screws 54 engaging the shanks 55 thereof. The jaw 48 is normally forced toward the stationary grippers 53, by means of springs 56 seated in suitable recesses and shown in Figs. 16 and 19, and inasmuch as the grip-operating device consists of two distanced members between which the operating mechanism for the jaw is disposed, while the jaw itself is really what may be considered free to move without any positive guidance at its ends, it will be understood that the operation of the rock-spindle 43 will cause both grippers 50 to engage the stock with equal pressure.

The feed-slide 45 is guided for movement on a bracket 57 secured to the upper surface of the bed 25 and having projecting ways 58 (preferably dove-tail), a shoe 59 being provided in connection with the slide 45 for frictionally engaging the projection 58, so that when the pitman-rod 41 above referred to is reversed, the slide 45 will be held stationary while the gripping jaw 48 will be moved either toward or away from the grippers 53 as the case may be, it being understood, however, that this frictional resistance is only such as to overcome the friction of the gripper-operating means, and it is achieved by a pair of plungers (see Fig. 18) in engagement with the shoe 59 and having their outer ends forced inward by an adjustable resilient member 61 shown herein as a blade-spring surrounding a bolt 62 which is held in the slide 45 and the spring pressure of which may be regulated by nuts 63.

After passing the feeding mechanism, the stock or wire passes through a device whereby any return movement of the stock during the retrograde movement of the feed-slide will be prevented. While different devices of this kind may be employed, I have shown in the drawings a device which is positively operated to grip and firmly hold the stock, while the feed-slide is returned to its position, and which will release the stock during the feeding stroke of the slide. The mechanism for accomplishing this result is clearly shown in Figs. 1, 8 and 15, and comprises a frictional member 64 which is vertically movable and is at its upper end shaped to fit the stock. The lower end of the member 64 is headed as at 65, and a spring 66 serves for the purpose of throwing said member downward and out of contact with the stock. As above stated, the member is positively operated to grip the stock which is always obtained by a lever 67 (see Fig. 8) pivoted at 68 in the casing 69 in which the member 64 is movable, the other end of the lever 67 being engaged by the end of an adjusting-screw 70 which is held in the free end of an arm 71 rigidly attached to a rock-shaft 72 which is journaled in bearings 73 attached to the bed-plate 25 of the machine. Rigidly secured to the other end of the rock-shaft 72, is a cam-lever 74 (see Figs. 1 and 2) provided at its free end with a roller 75 traveling in a groove 76, of a cam 77 which is secured to the main cam-shaft 31, above mentioned, and the timing of which relatively to the crank-pin 33 is such that when the latter is in its forward or feeding-stroke, the member 64 is free from the stock and vice versa, and when the crank-pin 33 is in its return stroke, the member 64 will be firmly pressed against the stock.

The next step which takes place after the stock has been fed forward is that of cutting-off from the stock a length corresponding to the blank to be formed, the cutting-off mechanism being clearly shown in Figs. 1, 6, and 14, and comprises the cut-off cam 78 rigidly secured on the cam-shaft 31 and having a groove 79 in engagement with a roller 80 which is carried by a connecting-rod 81, the front end of which is bifurcated and straddles a block 82 loosely carried on the shaft 31. The rear end of the rod 81 is connected with a pair of toggle-levers 83, 84, the latter of which is pivoted at 85 to an abutment-bolt 86 which may be adjusted vertically so as to bring the cutter into right position when the toggle levers are straightened out. The bolt 86 and the adjusting screw 87 are mounted in a bracket 88 secured to the bed-plate 25 (see Fig. 14) and having at its upper end an extension 89 in which the lower end 90′ of the cutter slide is guided, the latter being offset in the manner shown in Fig. 14, so as to permit the proper action and assemblage of the toggle-arms in a direct line with the force applied on the cutter. The upper end of the toggle-arm 83 is articulated to the cutter-slide 90 by a bolt 91, and it will, therefore, be seen that the rotation of the cam 78 will result in moving the cutter-slide 90 to cut from the stock S a blank B projecting into a hardened cutter-bushing 92 contained within the slide 90 and subsequently raising the same into position opposite a device whereby the blank is pushed out of the bushing 92 and into position between a pair of burring-rollers whereby the substantially square ends of the blank B will be rolled into what may be termed a "rounded" form for purposes hereinbefore set forth. The burring rollers are herein denoted by the numerals 93, 94 (see Figs. 6 and 7) mounted on shafts 95, 96 which are journaled in bearings 97 provided therefor in a standard 99 in which the cutter-slide 90 is also held for vertical reciprocation. The burring rollers are provided at their outer periphery with circumferential grooves 100 which conjointly leave a space between them equal to the diameter of the blank to be rolled, and which, furthermore, in connection with the flanges 101, 102 constitute means whereby the proper end-shape will be imparted to the blanks, as will be clearly seen in Fig. 7. It should be noted that in the present instance the flanges 101 and 102 touch circumferentially so as to inclose the blank entirely, entering spaces 103 being left in the flanges 101 and 102 through which the cut-off blanks may be pushed into position between the burring-rollers by a mechanism to be hereinafter described. The shafts 95, 96 of the burring-rollers 93, 94, respectively, are provided at their rear ends with pinions 104, 105 (see Figs. 1 and 6) both of which are in engagement with a driver 106 (see Fig. 14) mounted upon a spindle 107 journaled in a bearing 108, of a standard 109 which is attached to the top surface of the bed. The other end of the shaft 107 has rigidly mounted thereon a spiral-gear 110 (see also Fig. 8) which is in engagement with a similar gear 111 on a vertically disposed shaft 112 which is journaled in a bearing 113 mounted on the bed-plate, and the lower end of which carries a bevel-gear 114 in mesh with a similar gear 115. This gear is secured to a horizontal shaft 116 journaled in a bearing 117 having a flange 118 whereby said bearing may be attached to the bed 25. The front end of the shaft 116 has a bevel-gear 119 in mesh with a similar gear 120 on the main cam-shaft 31, so that in this manner the burring rollers 93 and 94 will be driven in similar directions constantly from the cam-shaft 31, and it is for this reason that the spaces 103 extend around a portion of the peripheries of said rollers so that no interference will exist with the proper insertion of the blank between said rollers.

Means are provided whereby each blank as it is entered between the burring-rollers, is supported in its position to be engaged and rolled by said burring rollers, these means consisting of a pair of guard-plates 121, 122 disposed above and below the line of rolling contact between said burring-rollers (see Figs. 6 and 14), these guard-plates being attached to the standard 99 and having their adjacent ends shaped so as to properly inclose the blank at points vertically diametrically to each other.

The mechanism whereby each blank after it has been cut off from the stock is transferred from the cutter-slide to its point of rest between the burring-rollers, or more particularly speaking, between the guard-plates 121, 122 is clearly illustrated in Figs. 1, 8 and 14. Referring first to Fig. 14 it will be seen that the cutter-slide 90 is in its lowermost position, so that when the cutter-cam is operated, the blank will be transferred by the cutter-slide into alinement with the opening between the guard-plates 121, 122, and also in alinement with an injector device shown herein as a push-rod 123, the forward end of which is provided with a pusher-pin 124 of such size as to readily pass between the guard-plates 121, 122. The other end of the injector-rod 123 carries a grooved-spool 125 which is engaged by the bifurcated end of an actuating-lever 126 which is fulcrumed at 127 on a standard projecting upward from the bed 25 and the other end of which is connected by a link 128 with a cam-lever 129, which latter is pivoted at 130 on the bed-plate 25, and which carries at its forward end a roller 131 traveling within a groove 132 of the injector-cam 133 which is secured to the main cam-shaft 31. It may be stated here that both flanges of each burring-roller are cut away as above described so that at the proper time the blank may not only be injected from one side of said burring-rollers, but, furthermore, that said blanks may be ejected therefrom at the proper time and into devices whereby further action on the blank as to the swaging of the shank may take place. Hence, it will be understood that the injector-rod 123 has in reality two movements of different amounts, namely: first, to inject the blank from the cutter-slide into position between the burring-rollers, and at a later period to inject the rolled blank from the burring-rollers into one of a number of chucks which pass in front of said burring-rollers and whereby successive blanks are taken from said rollers and transferred to a series of progressively-operative swaging-devices whereby the shank of the blank is properly shaped. From the foregoing, it is evident that the cut-away portions of the flanges of the burring-rollers are of such length as to accommodate not only the injecting of the blank between said rollers but also to accommodate the injector to perform its work in pushing the rolled blank into the chuck which may be ready to receive it.

Referring now to Figs. 6 and 8 which represent vertical sections through the machine at substantially the same line, but looking in opposite directions thereof, it will be noted that a housing 134 is secured to the top of the bed, which housing contains a series of consecutively operative devices whereby the shank portion of each blank is progressively reduced in diameter, and which are concentrically disposed around a common center and, for purposes of easy and simultaneous manipulation, are radial relatively to this center so that the means whereby said devices are actuated may all be controlled by one member which is common to all of them. Furthermore, by virtue of a transfer mechanism to be hereinafter described, and whereby the blank is brought into connection with the swaging devices, the latter are placed equidistantly apart in the manner shown. In the present instance five of these swaging or reducing devices are illustrated, the first one of which brings the shank of the blank into the shape illustrated by A (see Fig. 6); the second one rounds the blank again into shape as shown at B; the third device renders the shank elliptical in cross section as shown at C; the fourth brings it again into rounded form, and the fifth reduces the shank to its finished size by very slight compression on the shank shown at D.

The operation of the swaging devices has been clearly shown in Figs. 3 and 12 of which Fig. 3 represents the swaging device ready to start, and Fig. 12 illustrates the same in position after it has completed its work. It should be remembered that the several swaging devices above referred to are substantially the same in general construction and operation, the only difference between them being the shape of the swaging tools or dies which are made so as to correspond to the different shapes of the shank required by the several operations, respectively. Referring first to Fig. 12 in which the general organization and actuating mechanism of the devices in conjunction therewith is shown, the numerals 135, 136 denote a pair of short shafts journaled in suitable stationary bearings on the housing 134. Keyed, or otherwise rigidly secured to these shafts, are a pair of gear segments 137, 138 which are free from each other and carry swaging dies 139, 140, respectively, which as has been stated above, are shaped with their adjacent surfaces to shape or reduce the shank portion of the blank in the proper manner. The gear segments 137, 138 are in engagement with pinions 141, 142, respectively, the latter being secured on spindles 143 also journaled within the housing 134, the gears 141, 142, however, being in mesh, so that when one of said pinions is operated, the other one will also be rotated but in a reversed direction. The body of the pinion 141 has an extension 145 to which is articulated, as at 146, a link 147 which connects the arm 145 with a slide 148 mounted for horizontal movement on an extension 149 secured to, or forming a part of, the housing 134. It will, therefore, be seen that by moving the slide 148 toward the right and into position shown in Fig. 12, the pinions 141, 142 will be rotated from the position shown in Fig. 3 to that shown in Fig. 12, and consequently, the swaging dies 137, 138 will also have been rotated to compress or swage the shank of the blank between them, at the same time moving the latter longitudinally with its holding device. Means are provided for properly and timely actuating the slide 148, these means consisting substantially of a swaging-cam 150 (see Fig. 1) secured to the main cam-shaft 31 and having a groove 151 to receive a cam-roller 152 which is pivoted on the end of a lever 153. This lever is fulcrumed on a stud 154 secured to the bed 25 of the machine, and its other end is connected with the slide 148, by means of a link consisting in its preferred form of a pair of butt-ends 155, 156 which are screw threaded right and left hand, and connected by a turn-buckle 157 to obtain a fine adjustment as to the movement of the slide 148 and its resultant rotation of the pinions 141, 142.

Means are provided whereby the distance between the rolling axes of the swaging-dies may be varied so as to accommodate blanks of different diameters and also to precisionize the size of the blank-shanks, these means being illustrated in detail in Fig. 13 in which it will be noted that the ends of the spindles 135, 136 are journaled in eccentric bushings 135′, 136′ provided with slotted flange-portions through which clamping bolts 135″, 136″ may pass to hold said bushings rigidly in their adjusted positions. By virtue of this adjustment, it will also be noted that the swaging dies may be located so as to come into exact central alinement with the blank-carrying chucks on the carrier, or that in other words, the blank in the chuck will come into position with its axis exactly half way between the adjacent moving faces of said dies.

Disposed eccentrically with the several swaging-devices, and journaled in a bearing (see Fig. 12) which is secured to the housing 134, is a shaft 159 which constitutes the medium whereby the several blank-receiving chucks are carried into coöperation with the several swaging-devices, these chucks being mounted upon a carrier or spider which constitutes a transfer device for the blanks, and which is movable longitudinally of its axis to permit movement of the blanks with the swaging dies during the rotative movements thereof, and which is taken advantage of also to eject the finished blank from its chuck or holder at a particular point of its travel around the axis of the shaft 159.

The construction of the blank-receiving chucks and their supporting spider or carrier is clearly illustrated in Figs. 1, 5, 9, 10 and 11. Referring at first to Fig. 5, it will be seen that the present chuck-carrier supports eight chucks 160 which are preferably of the spring-pressed variety (see Fig. 10) and have a longitudinal rod 161 extending therethrough to serve not only as a medium against which the inner end, or more particularly speaking, the head portion thereof, will abut so as to leave the shank-portion of the blank projecting for the required distance beyond the end of the chuck, but will also act as a means whereby the finished blank will be ejected therefrom at the proper time. Again referring to Fig. 5, the station where blanks are entered into the successively arriving chucks is indicated by numeral I. The first swaging or reducing operation takes place at II. The next swaging or rounding operation takes place at station III. The next swaging or flattening operation takes place at station IV. The final rounding of the shank takes place at station V, and the finishing operation takes place at station VI. The blank is discharged or ejected from its chuck at station VII, it being understood that every time any particular chuck arrives at any one of the stations just enumerated, the carrier stops long enough in its rotation to permit proper action of the swaging devices, or the injecting mechanism, or the ejecting mechanism. From the foregoing, it will be understood that the rotative movement of the carrier is really intermittent, and I accomplish this result by a star-wheel-and-crank mechanism such as is clearly shown in Fig. 9. The shaft 159 is, as above stated, journaled in a bearing 158, and it is also supported in a bearing 162 secured to the bed 25 and in which bearings, the shaft 159 is not only rotatable, but also movable longitudinally for purposes hereinafter set forth.

Referring to Fig. 11, the carrier or transfer mechanism comprises as one of its elements a spider 163 which is rigidly secured on the shaft 159 and which is provided with a series of bearings 164 within which the blank-receiving chucks 160 are rotatably held, while the rods 161 thereof project rearwardly into bushings 165 which are adjustably supported in a ring or annulus 166 which is properly distanced and positioned relatively to the spider 163, as for instance by spacer-bolts 167. It will, therefore be understood that when the shaft 159 is moved longitudinally in its bearings, said carrier or spider 163, together with the annulus 166 will be moved therewith. Now, the organization of the chucks, as far as their rotation is concerned, is such that as each chuck travels from one station to the next one, the chuck is rotated 90°, so that when the swaging devices operate on the shank of the blank in the chuck, the results illustrated in connection with Fig. 6 will be obtained. The mechanism for imparting these "quarter turns" to the chucks is clearly shown in Fig. 5, in which it is seen that each chuck has a gear 168, the adjacent pairs of which are in engagement with intermediates 169 journaled on studs 170 which are rigidly held in the spider 163, and said intermediates 169 are in constant engagement with a preferably stationary pinion 171 secured upon the bearing 158 (see Fig. 12) above mentioned. This means that when the spider 163 is rotated on the shaft 159 the gears 168 will be revolved around the axis of this shaft, and at the same time they will rotate on their own axes 90° from station to station. As above stated, the rotative movement of the shaft 159 is intermittent as caused by a star-wheel 172 (see Fig. 9) having a series of radial grooves 173 adapted to be successively engaged by a roller 174 carried on the free end of a crank-arm 175 which is rigidly secured on a shaft 176, and the hub 177 of which is properly shaped to engage recesses 178 disposed between the actuating grooves 173 and serving as a means for locking the star-wheel against movement when the crank-pin roller 174 is out of engagement therewith. The shaft 176 is journaled in a bearing 179 formed on the bracket which supports the bearing 162, and it also finds a support in another bearing 180 secured to the bed plate 25. Interposed between the bearings 179 and 180 and held against longitudinal movement with the shaft 176, is a bevel-gear 181 which has a key connection 182 with said shaft to permit the latter to slide through the same at the same time when the shaft 157 is shifted longitudinally, both shafts being connected by an arm 183 in the manner shown in Fig. 11 in which both shafts are shown in their extreme rear position toward the right, while in Fig. 1 the shaft, together with the carrier and other component elements is illustrated in its extreme forward position. The purpose of this shifting movement is to move the chucks with the blanks contained therein to correspond with the action of the swaging devices, and also at the same time to maintain the intermediate driving mechanism in proper correlation to the spider, and also to effect the proper operation of the ejecting mechanism which latter comprises in the present instance a stationary member (see Fig. 10) in screw threaded engagement with a part of the bed 25, so that proper adjustment may be had thereof, and it will actuate the ejector rods 161 as illustrated in that figure to eject the blank at station VII, the bed 25 being cut away at this place in the manner shown in Figs. 4 and 5.

The means for shifting the shafts 159 and 176 consists substantially of a spool 185 having a groove 186 engaged by the forked end of a lever 187, said spool being preferably screw threaded on the shaft 159 to permit proper positioning thereof, so as to move the shaft 159 and the chucks carried thereby into proper position. The lever 187 (see Fig. 1) is fulcrumed at 188 on the bed 25 and its end is connected by a link 189 with a cam-lever 190 which carries at its forward end a roll 191 riding in a cam-groove 192 provided in the shifter cam 193 which is secured to the cam-shaft 31, above described. The shaft 176 is continuously rotated through the gear 181, above mentioned, which is in engagement with a bevel-pinion 194 secured upon the end of a transverse shaft 195 (see Figs. 1 and 4) which carries at its forward end a pinion 196 driven by a gear 197 on the cam-shaft 31.

The operation of my improved machine is as follows:—A wire corresponding in diameter to the head of the screw blank to be formed is threaded into the machine from the right hand of Fig. 1 by passing the same between the grippers carried on the jaws of the feed-slide 45 and thence to the stock-holding device 64, thence through a guide-bushing in the standard 99 on which the cutter-slide is movably supported. When this slide is in its lowermost position, the cutter-bushing 92 will be in alinement with the stock, so that the latter may be entered into the slide for the required amount by the feeding mechanism whereupon the slide is moved vertically to bring the cut-off blank into alinement with the space between the guard-plates 121, 122. The injector-rod 123 then advances with the pusher-pin 124 which latter pushes the blank between the burring rollers whereby the ends of the blank are rounded as required. As soon as this operation has been satisfactorily completed and the cutter-slide has been retracted, the injector-rod 123 again advances forcing the burred blank from between the burring-rollers and into the chuck which has arrived at that point. The carrier is then rotated, finally bringing the blank into position opposite station II at which point the shank is operated upon by the first set of swaging dies to form the same into elliptical cross section, as shown at A in Fig. 6, the carrier during this operation moving slightly rearward in correspondence to the action of the swaging devices. The blank is now clear so that the carrier can again be rotated to bring the blank in alinement with the swaging devices located at station III, while at the same time it has been turned axially for 90°, so that the swaging devices at this station will compress the shank at points disposed at right angles to that of the first set. The blank is then transferred to station IV where the blank is again swaged into elliptical form but smaller than at station II. By the next movement of the carrier the blank is carried to station V where the elliptical shank will be again reduced into a round form similar as at station III, but having a smaller diameter, and finally the blank is transferred to station VI where the finishing dies complete the blank at which time the formerly rounded shank end has become practically square at its end by virtue of the stretching out or lengthening process which the outer surface of the shank has undergone. The next partial rotation of the carrier will bring the blank from station VI to station VII at which point the stationary ejector abutment 184 is disposed, so that when the carrier in its entirety is drawn rearward by the shifter-cam 193, the finished blank will be pushed out of its chuck whence it will fall on to the inclined surface of the bed 25 at that point, and from there drop to the floor or into a suitable box provided for that purpose.

The above explains the operation as far as one blank is concerned, and it will, of course, be understood that each other chuck of the series will receive a blank and subject it to the same identical operations as the one described.

Many changes may be made in the construction and organization of the several component elements of the machine, without departing from the spirit of the invention, and I wish it distinctly understood that I do not confine myself except so far as required by the scope of the claims to the employment of the specific operating means for the several devices, the operation of which may be effected in many different ways.

I claim:—

1. The combination with feeding-in mechanism and a cutting-off mechanism comprising a movable cutting-member, of rollers for burring and rounding one end of the blank, and an injecting mechanism for transferring the blank from the cutting-member into position between the burring rollers.

2. The combination with feeding-in mechanism and a cutting-off mechanism comprising a movable cutting-member, of burring-devices, and a reciprocatory plunger for injecting the blank from the cutting-member into the burring-devices.

3. The combination with feeding-in mechanism and a cutting-off mechanism comprising a movable cutting-member, of burring-devices, a reciprocatory plunger, a pusher-pin carried by said plunger, means for positioning said pin in the plunger, and means for actuating said plunger to inject a blank into position between the burring-rollers.

4. The combination with feeding-in mechanism, and a cutting-off mechanism comprising a movable cutting-member, of burring-devices, and means for first injecting a blank into the burring-devices and subsequently injecting the burred blank from said burring-devices.

5. The combination with feeding-in mechanism, and a cutting-off mechanism comprising a movable cutting-member, of burring-devices, and means to inject a blank into position between the burring-devices.

6. The combination with feeding-in mechanism, and a cutting-off mechanism comprising a movable cutting-member, of burring-devices, and an injecting mechanism having differential movements for first injecting a blank into position between the burring devices and subsequently ejecting the burred blank therefrom.

7. The combination with cut-off mechanism, burring-devices, and a transfer mechanism for transferring blanks from the cut-off mechanism to the burring-devices, of means for injecting blanks from the cut-off mechanism into engagement with the burring-devices, and means for actuating said injecting mechanism to eject the blank from the burring-devices.

8. The combination with burring-devices, blank-reducing mechanism, and means for transferring blanks from the burring-devices to the reducing mechanism, of means for injecting blanks from the burring mechanism into the transfer mechanism.

9. The combination with burring-devices, blank-reducing mechanism, and means for transferring blanks from the burring-devices to the reducing mechanism, of means for injecting blanks from the burring mechanism into the transfer mechanism, and means for bringing said blank mechanism into engagement with the reducing mechanism.

10. The combination with burring-devices, blank-reducing mechanism, and means for transferring blanks from the burring-devices to the reducing mechanism, of means for injecting blanks from the burring mechanism into the transfer mechanism, and means for bringing said blank mechanism into engagement with the reducing mechanism, and means for ejecting blanks from the transfer mechanism.

Signed by me at Springfield, Mass., in presence of two subscribing witnesses.

GEORGE T. WARWICK.

Witnesses:
G. R. DRISCOLL,
WM. S. BELLOWS.